United States Patent Office 3,315,524
Patented Apr. 25, 1967

3,315,524
MASS-FLOW MEASURING DEVICE
Laurence Sidney Duffy, Redbourn, and Ian Carrodus Hutcheon, Luton, England, assignors to George Kent Limited, London, England, a corporation of the United Kingdom
Filed Jan. 6, 1964, Ser. No. 335,980
Claims priority, application Great Britain, Jan. 11, 1963, 1,367/63
20 Claims. (Cl. 73—231)

This application is a continuation-in-part of our co-pending application Ser. No. 303,265, now abandoned.

This invention relates to electronic measuring devices for use in flow metering installations or the like. The invention is particularly useful in converting a reading relating to one variable of material flowing past a specified point to another reading related to a second variable of the material, and/or to a reading or readings integrating all the previous readings.

The invention may, for example, be applied to the flow of solids, liquids or gases. In the case of solids, the invention may be used to obtain a reading of the total solids passed on, e.g., a conveyor belt by continuously taking a reading of the weight of solids present on the conveyor belt during use. In the case of gases it may be desired, for example, to determine the heat content of all gases passing a point, and this invention may be used to provide an indication from the volume flow of gas past the given point of both the heat content of the gas passing that point, and of the total heat content of gas passed throughout the duration of the process.

The invention is, however, of particular value in connection with metering fluids, especially liquids, and hence the following description is directed largely thereto.

In its simplest aspect, the invention operates from an input of pulses, the nature of which are determined by one characteristic of a material passing a given point, these pulses then being converted into a series of further pulses which provide an indication of some other characteristic of the material passing that point.

It is an object of the present invention to provide a system for converting one series of pulses, the nature of which is dependent on a flow rate of material in terms of one characteristic of the material, into a second series of pulses to provide a reading of the flow rate of material in terms of some other characteristic than that previously measured, and/or to provide a measure indicating the integral of all such readings.

It is a further object of the present invention to provide a fluid flow measuring device for producing from an electrical carrier signal, modulated in amplitude at a frequency which is proportional to a volumetric flow rate of fluid, an output indicative of mass flow rate and/or a measure of total mass flow.

In this specification the term "diode pump" will be used to refer to a known circuit comprising a capacitor associated with a pair of diodes, the circuit being connectable to a source of electricity and to a load; the diodes being arranged to act, in response to a series of pulses, as a switch alternately to charge the capacitor from the source and to discharge it to the load. The term "stroke" will be used to refer to the potential range between which the capacitor is charged and discharged, the amplitude of the stroke being the voltage difference between the two states and the frequency of the stroke being the repetition frequency of the charge-discharge cycle.

According to this invention a system for converting one series of electrical pulses, having one mean pulse repetition rate, into another series of electrical pulses having another mean pulse repetition rate, comprises an input diode pump and an output diode pump, each as herein-before defined; a reservoir capacitor connected as load to the input diode pump and as source to the output diode pump; means for connecting the input diode pump to a source; means for driving the input diode pump at a stroke frequency related to an input signal having the said one mean pulse repetition rate; and means for driving the output diode pump at a mean stroke frequency related to the voltage on the reservoir capacitor and for deriving therefrom an output signal which is the said other mean pulse repetition rate.

The stroke amplitude of the input diode pump may be controlled in accordance with one or more quantities to be related to the said one mean pulse repetition rate, so that the said other means pulse repetition rate is related to all the quantities.

As stated above, the invention is particularly useful in connection with fluid flow measurements, and accordingly in the preferred embodiments the system of the invention is used in a fluid flow metering installation, the input signal being derived from a pick-off and comprising a signal having a frequency proportional to the volume flow rate of fluid passing the flow metering installation. These embodiments are especially valuable where the metered fluid is a liquid.

In one embodiment to be described, the output diode pump is adapted to be driven from an oscillator whose mean frequency is controlled by the voltage of the reservoir capacitor.

In an alternative embodiment, both diode pumps are adapted to be driven from the same input signal and to be operated simultaneously, except when operation of the output diode pump is deliberately inhibited.

Preferably the input diode pump emits pulses of charge whose magnitude is determined by a voltage excursion of which one of the limits is automatically set in response to temperature compensating means and the other is capable of being set to a predetermined value, so that changes in density of the liquid induced by temperature changes in the liquid are compensated and the indication is in mass units.

It is also preferred that the amplitude of the pulses from the input diode pump be variable to allow for changes in the density of the liquid from a nominal specific gravity value at some reference temperature. This feature is of value particularly where the system is to be used at different times with two or more liquids of different densities.

Additionally, means may be included, such as a current meter, operable in response to the pulses, for providing an indication of liquid mass flow rate.

The invention is illustrated in the accompanying drawings in which.

The description which follows describes the application of the measuring device of the present invention to the measurement of hydrocarbon fuel flow; however, the circuit together with an associated flow transmitter of suitable design may be applied, in general, to the measurement of any flow, provided that in liquid or gas measurements any temperature variations that may occur are not excessive. The extent of permissible temperature variation is prescribed mainly by the physical nature of the liquid or gas, and even if temperature compensation is provided, variations which are too large will lead to inaccuracies if the relationship between temperature and e.g., specific gravity departs significantly from that assumed.

Figure 1:
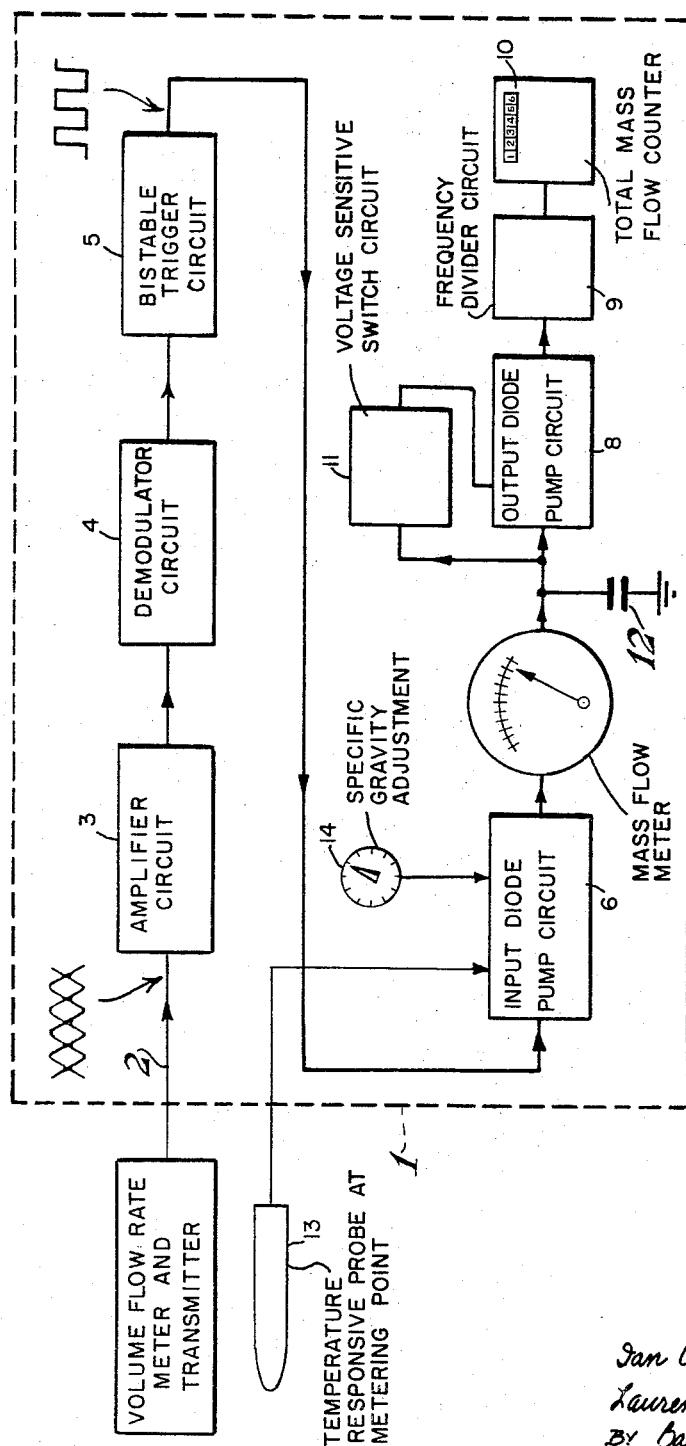
FIGURE 1 is a schematic block diagram of a measuring device.

Referring to FIGURE 1 of the drawings, a measuring device comprises a receiver generally indicated at 1, into the input 2 of which is fed an amplitude-modulated carrier frequency input signal. Such an input signal may be produced by a turbine-type, inferential flow transmitter utilizing a magnetic pick-off of the type described and claimed in our British application No. 15,518/61, now British Patent No. 984,209.

For flow of solids on, for example, a conveyor belt, the modulation frequency would be related to the belt speed, while the amplitude of the pump stroke or strokes could depend on the weight of solids on the belt or on a given portion of the belt at any one time. Similarly in measuring the heat content of gases, the volume flow of gas could control the modulation frequency, while the heat content or some directly related variable, could be continuously measured so as to determine the amplitude of the stroke or strokes. From the input 2, the input signal is passed through an amplifying stage 3 and thereafter traverses a demodulating stage 4, to a bistable trigger stage 5. The functioning of the demodulating stage 4 has an important additional action which is to minimise the effects of electrical pick-up. This latter action is achieved by incorporating into the demodulating stage a diode pump, comprising a capacitor and two diodes, feeding into a further capacitor, the component values being selected so that several carrier pulse signals are necessary before the voltage on the second capacitor is sufficiently large to operate the bistable trigger stage 5. Thus by the same means several consecutive stray pulses are required to cause interference. It will readily be appreciated that this protection exists only if the input is in the form of a modulated carrier frequency, and cannot be provided with some prior art systems.

The output of the bistable trigger stage 5 operates an input diode pump stage 6, the purpose of which is to introduce the preferred feature of density compensation.

It will be appreciated that with any liquid if its physical composition is unchanged and the temperature remains contant, its mass can be inferred from its volume using simple conversion factors. If, however, its temperature changes, then the density will change. In the case of hydrocarbon fuels this relationship is substantially linear over a wide range of temperature. Furthermore, it can be shown that the rate at which density changes with temperature is substantially the same for a wide range of hydrocarbon fuels. Therefore, by introducing temperature responsive element the volume flow rate signal can be so modified as to provide an output which is proportional to mass flow rate.

The input diode pump 6 is arranged so that its capacitor is charged and discharged through a voltage range the limits of which are variable to compensate for changes in density of the fuel caused by changes of fuel temperature and/or by the use of different fuels having different nominal specific gravities. The response of the circuit to changes of temperature is automatic and an important feature of the invention. The limits of the voltage range may be set so as to determine the amplitude of the strokes of the input diode pump at a value appropriate to the density of any particular liquid under consideration. In temperature compensation, it is preferred that one of the limits be set in response to the temperature compensating means used and that the other be capable of being set at a predetermined value.

In a practical embodiment of the device, the temperature sensing is effected by a temperature-sensitive resistor housed in a probe 13, the probe 13 being in contact with the liquid, so that the resistor continuously monitors the fuel temperature, whilst nominal changes of specific gravity are compensated for by the use of a hand-set, precalibrated, potentiometric circuit whose manual adjustment means 14 is shown in FIGURE 1.

The signal delivered by the diode pump 6 is thus a train of unidirectional pulses which constitute a pulsating direct current whose mean value accurately represents the mass rate of flow of the fuel. This current is fed to a mass flow rate indicator 7, comprising a milliammeter.

The current is also fed to a reservoir capacitor 12 from which it is extracted by an output diode pump 8. A voltage-sensing and pulse-generating switch circuit 11 senses the voltage on the reservoir capacitor 12 and operates the output pump at such a rate that the voltage on the capacitor 12 is always held to a predetermined and preferably low value and hence all the current fed into it is extracted again from it. The capacitor of the output diode pump, which is not shown in FIGURE 1, is charged and discharged through a constant voltage range, hence its frequency of operation is proportional to the mass flow rate of fuel, and the total number of pulses occurring in a period is an accurate measurement of the total mass of fuel which has passed through the flow transmitter. Dividers 9 reduce the frequency of the pulse train generated by the output diode pump and enable an electromechanical counter 10 to be operated to provide an indication of total mass flow of fuel.

Figure 2:
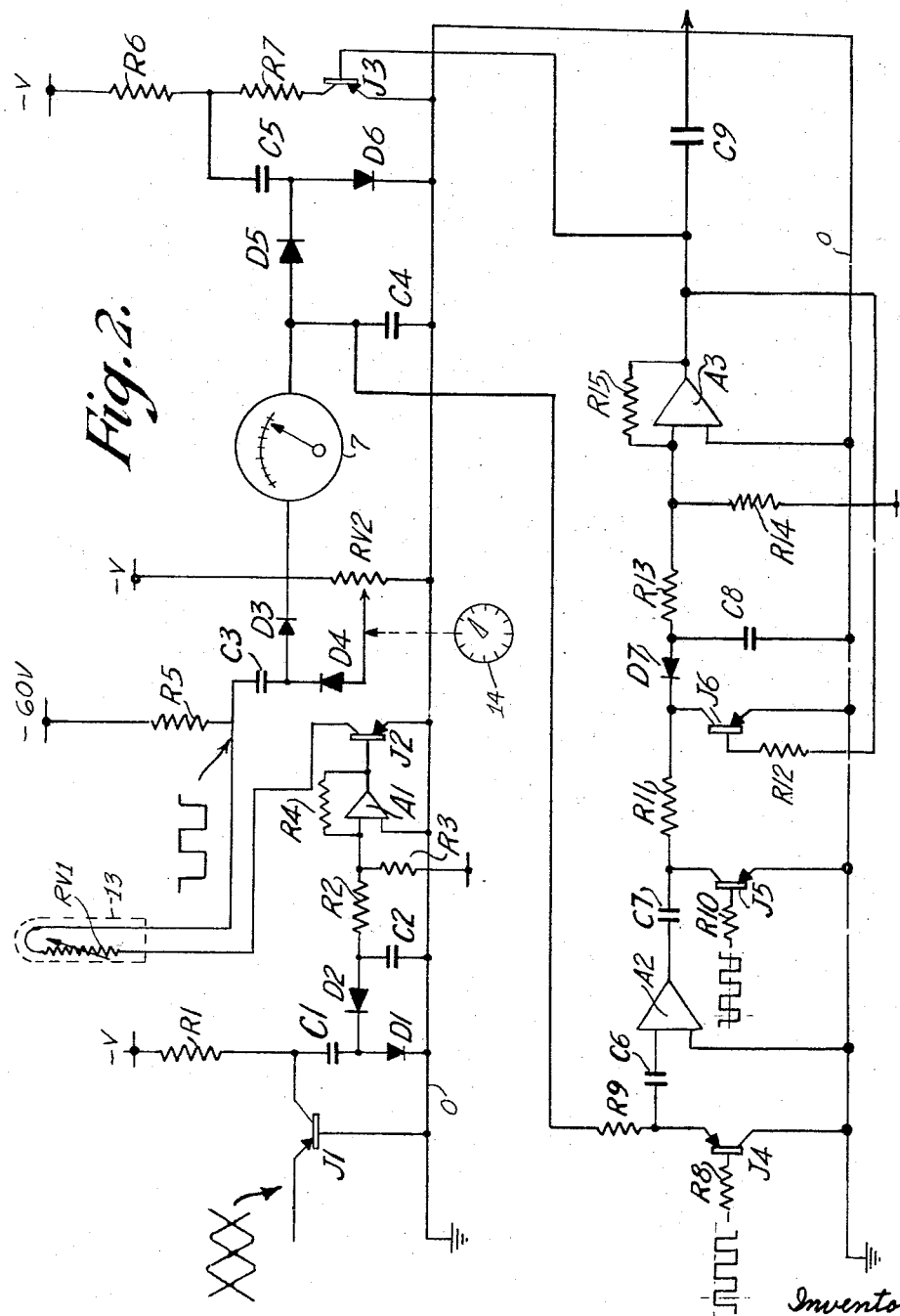
FIGURE 2 illustrates a practical embodiment of the circuit of the measuring device shown in FIGURE 1.

Referring to FIGURE 2, which illustrates one practical embodiment of the circuit of a measuring device, a modulated carrier frequency signal, amplified by transistor $J_1$, is developed across the collector load resistance $R_1$. This signal is detected by a demodulating and noise filtering circuit, connected between the collector of $J_1$ and a common earth line O, and comprises the diodes $D_1$ and $D_2$ and the capacitors $C_1$ and $C_2$. The values of $C_1$ and $C_2$ are chosen so that approximately five carrier pulse inputs are required before the voltage developed across $C_2$ is sufficient to switch a first bistable trigger circuit comprising the amplifier $A_1$ and resistors $R_2$, $R_3$ and $R_4$. Any spurious pulses arriving whilst $C_2$ is charging will add to its total charge causing $A_1$ to switch a little early; subsequently, as long as carrier frequency pulses are arriving at $C_2$, $A_1$ will remain switched on, and in fact does not reset until the modulation envelope reaches a low level. Thus although the modulation mark-space ratio may momentarily be altered the signal frequency remains unaffected. $A_1$ is a conventional direct-coupled transistor amplifier, well known in the art, arranged by means of positive feedback through resistor $R_4$ to switch on at one critical voltage and to reset, i.e. switch off, at another, lower, critical voltage. The voltage levels of these two states are determined solely by the selection of $R_2$, $R_3$ and $R_4$.

The output from the amplifier $A_1$ switches transistor $J_2$ on and off at the modulation frequency. The output from $J_2$ operates the input diode pump comprising capacitor $C_3$ and diodes $D_3$ and $D_4$ via a voltage dividing network comprising resistors $R_5$ and $RV_1$ (these acting as the collector load of transistor $J_2$) and a voltage setting potentiometer $RV_2$. $RV_1$ is a temperature-responsive element whose resistance varies with its temperature and is externally mounted in a probe 13 at the metering point. The probe is housed in the fuel-flow transmitter so that the temperature and hence density of the fuel is continuously monitored. $RV_2$ is a precalibrated, handset, potentiometer and is adjustable by means 14 to provide a voltage reference value, $V_m$, at its contact appropriate for the nominal specific gravity of the fuel in use.

The operation of the input diode pump is as follows:

(In this description the voltage drops across the diodes $D_3$ and $D_4$, and the small voltage on the following reservoir capacitor, $C_4$, are neglected.) When $J_2$ switches off, $C_3$ charges up to a voltage determined by the potential of the supply to which $R_5$ is connected, i.e., $-(60+V_m)$ volts. When $J_2$ subsequently switches on, $C_3$ discharges to a voltage $V_a$ volts, where:

$$V_a = -60\left(\frac{R_{v1}}{R_{v1}+R_5}\right)$$

Hence the range of voltage $\delta v$ through which $C_3$ charges and discharges is $V_a+(60+V_m)$, i.e.

$$\delta v = 60\left(\frac{R_5}{R_{v1}+R_5}\right)+V_m$$

and the pump delivers pulses whose charge is $C_3 \delta v$. It can be seen that any increase in $R_{v1}$ with increasing temperature reduces the magnitude of each pulse, and it can readily be shown that this effect will provide suitable compensation for the reduction in fuel density caused by the rise in temperature.

Similarly it can be seen that an increase of $V_m$, since $V_m$ is negative, reduces the magnitude of each pulse, and it can readily be shown that $R_{v2}$ thus will act as a manually pre-set adjustment to compensate for differences in nominal specific gravity between different fuels.

In practice the voltage-drops across diodes $D_3$ and $D_4$ reduce the pulse magnitude somewhat, but this effect can be allowed for by suitable choice of the circuit resistor values. The voltage across $C_4$ is made so low as to be negligible. Since the output from the pump is proportional to the capacitance of $C_3$, this capacitor is chosen to be of a high stability type.

The output from the input diode pump, constituting a pulsating, direct current, is passed through a milliammeter type of instrument 7 which provides an instantaneous indication of the fuel mass flow rate.

The remaining circuits provide an output indicative of total mass flow and operate as follows:

The current flowing through the milliammeter is fed into a reservoir capacitor $C_4$. This current is then extracted from $C_4$, via a potential divider circuit comprised of resistors $R_6$ and $R_7$, by the output diode pump. The latter is formed by the capacitor $C_5$ and the diodes $D_5$ and $D_6$, and is driven by the transistor $J_5$. Resistors $R_6$ and $R_7$ form the collector load of $J_3$.

$J_3$ is switched on and off by a pulse input to its base obtained from a circuit including a high-gain chopper-type D.C. amplifier, which comprises an A.C. amplifier with a chopper input and output, and a pulse generator in the form of a relaxation oscillator. These circuit elements are shown in the bottom portion of FIGURE 2. The pulse generator provides the output pulses to drive $J_3$, whilst the A.C. amplifier monitors the voltage level on the reservoir capacitor $C_4$, and switches the pulse generator on or off according to whether or not this voltage exceeds a predetermined value. Thus when the charge on $C_4$ has accumulated, the output diode pump operates repeatedly to remove it and so maintains the average value of charge on $C_4$ constant and at a near zero level. Since capacitor $C_5$ in the output diode pump charges and discharges through a constant voltage range, the number of pulses generated by the pump in a given period is proportional to the average current fed to $C_4$ and hence to the total mass of fuel which has passed through the transmitter in that period. Thus the output pulse generator provides the driving signal for the electronic dividers and an electro mechanical counter, of conventional type, for indicating total mass flow. Said capacitor $C_5$ is chosen to be a high stability capacitor of the same type as the previously mentioned capacitor $C_3$, so that any small variation in capacity with temperature of one tends to be compensated by a similar variation in capacity of the other, and the indication of total mass flow remains accurate. In a somewhat similar manner, any variations in the voltage drop across diodes $D_5$ and $D_6$ with temperature tends to be compensated by similar variation in diodes $D_3$ and $D_4$.

In the output diode pump, $D_5$ and $D_6$ are silicon diodes whose forward drops are greater than the voltage at any time on $C_4$. Hence the charge on $C_4$ cannot leak to any significant degree through diodes $D_5$ and $D_6$ to earth.

It should be particularly noted that since the value of charge on $C_4$ is maintained at all times at a constant, very low, level (compared with the charge flowing into and out of it) temperature effects in $C_4$ due to variations in ambient temperature and leakage are not of any consequence.

Examples of suitable output circuits as illustrated in FIGURE 2 may be described as follows:

A high-gain chopper-type D.C. amplifier comprises chopper-transistor $J_4$, capacitor $C_6$, a direct-coupled A.C. amplifier $A_2$, well known in the art, capacitor $C_7$ and output chopper transistor $J_5$. Resistors $R_8$ and $R_{10}$ are connected to the bases of $J_4$ and $J_5$ respectively for the purposes of limiting the current drawn therefrom. The chopping frequency is 2 kc./s. and square wave signals representative of this frequency are applied to transistors $J_4$ and $J_5$ via resistors $R_8$ and $R_{10}$ such that they are in a predetermined phase relationship.

The signal representative of the D.C. voltage level on capacitor $C_4$ is applied at the emitter junction of $J_4$ via current limiting resistor $R_9$. This signal is converted into A.C. at 2 kc./s. of related magnitude and is amplified and demodulated by output chopper $J_5$. The output, in the form of unidirectional pulses of appropriate polarity, is fed via resistor $R_{11}$ and diode $D_7$ into capacitor $C_8$. An input of about 50 mv. to the amplifier is sufficient to operate the following pulse generator.

The pulse generator coupled with the chopper-type amplifier comprises a direct-coupled D.C. amplifier $A_3$ arranged as a second bistable trigger circuit in a like manner to the first bistable trigger circuit wherein resistors $R_{13}$, $R_{14}$ and $R_{15}$ correspond in function to resistors $R_2$, $R_3$ and $R_4$ of the first bistable trigger circuit, and further comprises the before-mentioned diode $D_7$ and capacitor $C_8$, and a gating transistor $J_6$ base-coupled to the output of $A_3$ via a current limiting resistor $R_{12}$ which is connected such that the emitter connects directly to the common earth line O and the collector connects directly to the common junction between resistor $R_{11}$ and diode $D_7$.

The output of $A_3$ connects also directly to the base of transistor $J_3$, and provides the driving signal thereto, and to various well known output stages such as frequency dividers, and electrical and electro-mechanical counters, via the blocking capacitor $C_9$.

The detailed sequence of operation of the high gain amplifier and pulse generating circuit is as follows: Assuming $C_4$ is already charged to its mean value, a pulse arriving from the input diode pump will lift its voltage above the threshold value of the amplifier $A_2$. Assuming also the gate $J_6$ to be open, the bistable trigger, which is formed by the positive feedback amplifier $A_3$, and the associated resistors, switches on, thus switching on in turn $J_3$. $J_6$ is likewise switched on, thus blocking any further signal from $A_2$.

The signal output from the amplifier $A_2$ besides switching on $A_3$ also charges $C_8$ which holds $A_3$ on for a sufficient time for the output diode pump to operate correctly. The charge on $C_8$ leaks away through the input of the bistable trigger and, after a suitable time, the voltage input at $A_3$ has dropped sufficiently to enable $A_3$ to switch off. $J_3$ switches off. $J_6$ also switches off, so that the gate is again open, and if, despite the removal of charge from $C_4$, the voltage on it is still above a threshold value, $A_3$ again switches on after a delay defined by $R_{11}$ and $C_8$, and the process repeats, thus removing another charge from $C_4$. Further charges will be removed in a like manner until the voltage on $C_4$ is less than the threshold value of $A_2$. Thereafter the whole circuit remains in a relaxed state until a further input signal arrives.

In the embodiment of the device illustrated in FIGURE 2, a pulse-output frequency generator is employed to drive the output diode pump whenever the voltage of capacitor $C_4$ exceeds a predetermined value. During its functioning, the output diode pump is free running at a greater frequency that the input pulse frequency, so that the output diode pump remains capable of maintaining the voltage level of the capacitor $C_4$, about the predetermined value, independently of the input pulse and charge rate. Thus by the nature of its operation, the duty cycle of the output diode pump is almost always dissimiliar to that of the input diode pump and thus the cause of some error.

Figure 3:
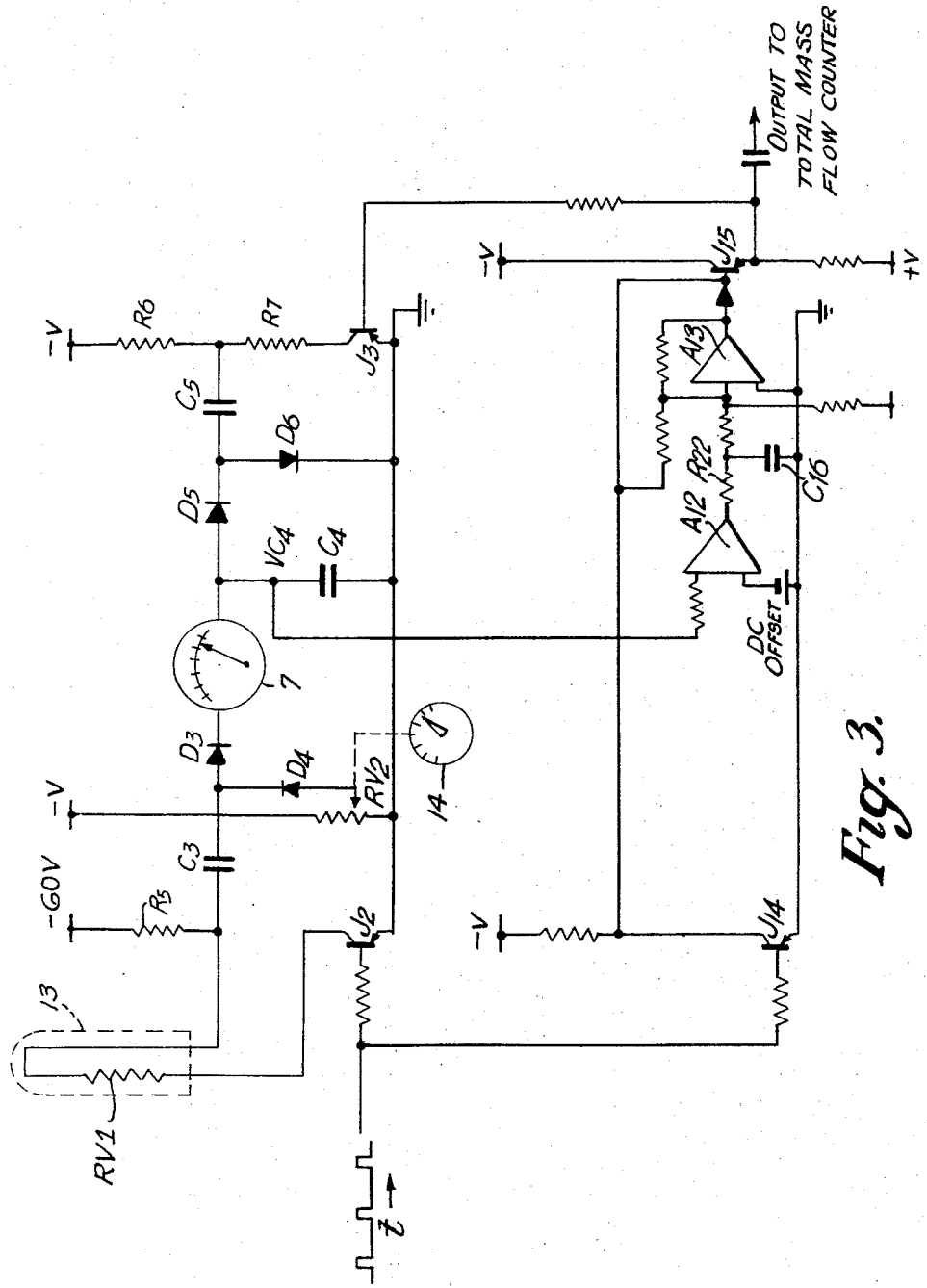
FIGURE 3 illustrates a modification of the circuit shown in FIGURE 2 and, FIGURE 4 illustrates wave forms of the driving and input pulses and capacitor voltages during typical operation of the circuit shown in FIGURE 3.

This error may be obviated by means of a modification to the circuitry, shown in FIGURE 3, whereby the output diode pump is arranged to be driven by the same signal as that which drives the input diode pump and to be operated simultaneously except when its action is deliberately inhibited.

Referring to FIGURE 3, the input signal is applied, in a similar manner to that previously described, to a bistable trigger circuit (not shown). The square wave output of the trigger circuit is arranged to switch transistor $J_2$ on and off at the modulation frequency. The output from transistor $J_2$ controls the input diode pump, comprising capacitor $C_3$ and diodes $D_3$ and $D_4$, which operate to charge capacitor $C_4$ in the manner previously described.

Capacitor $C_4$ is discharged by an output diode pump comprising capacitor $C_5$ and diodes $D_5$ and $D_6$ driven by transistor $J_3$. Transistors $J_2$ and $J_3$ normally switch in synchronism but in opposite senses; i.e. $J_2$ on $J_3$ off, $J_2$ off $J_3$ on. Transistor $J_{15}$ is connected to transfer $J_{14}$ in an emitter-follower configuration and provides the drive of $J_3$.

Figure 4:
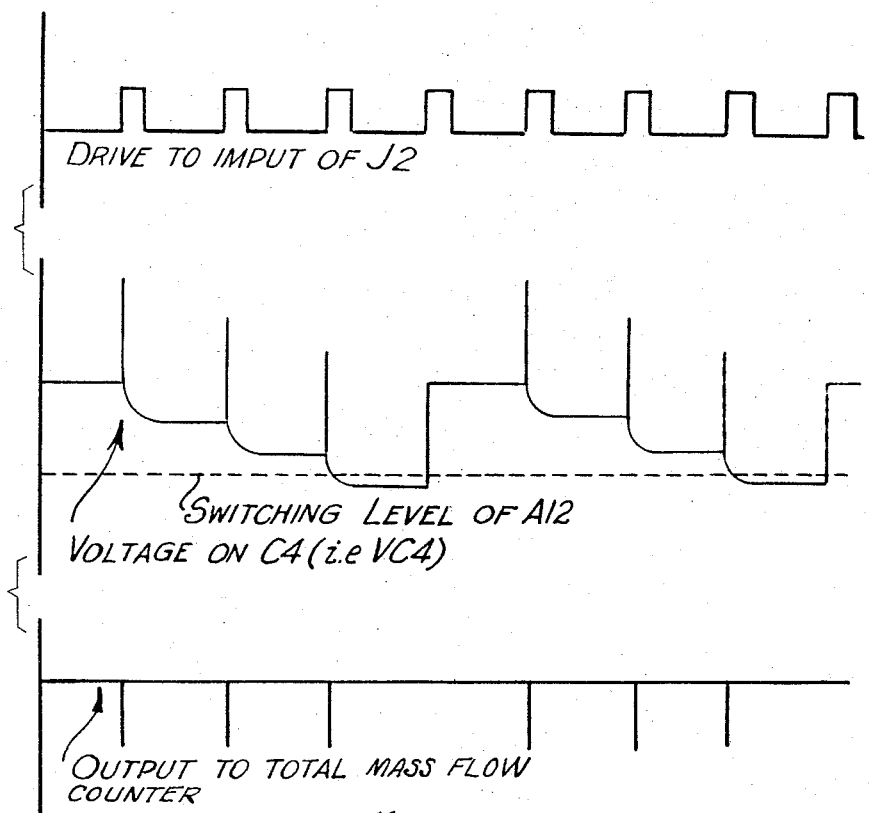

The quantity of each charge extracted from the capacitor $C_4$ by the output diode pump is arranged to be of some fixed value, which slightly exceeds the maximum value of each charge which is fed into the capacitor; hence there will be, overall, a tendency for the voltage of capacitor $C_4$ to fall slowly, as shown in FIGURE 4. The rate at which the voltage falls will be dependent on the magnitude of the input pulses, which corresponds to the specific gravity of the fuel.

The voltage of capacitor $C_4$ is monitored by a high-gain chopper-type D.C. amplifier $A_{12}$, which has a D.C. offset, that normally holds a bistable trigger stage $A_{13}$ in the released condition. Thus, pulses fed from transistor $J_{14}$ to transistor $J_{15}$ will be passed to transistor $J_3$, causing the latter to switch in synchronism with transistor $J_2$. When the voltage of capacitor $C_4$ falls to the predetermined level the trigger stage $A_{13}$ will be operated, the effect of which is to bias the base of transistor $J_{15}$ and to lock transistor $J_3$ off. When a further pulse appears, transistor $J_2$ only will pump and the charge added to capacitor $C_4$ will result in an increase in the value of the charge on the latter capacitor, above the predetermined level. The trigger $A_{13}$ then releases, removing the inhibit signal from transistor $J_{15}$ and thus permitting transistor $J_3$ to reset and to respond to succeeding pulses. The process repeats itself only when the voltage on capacitor $C_4$ again falls below the predetermined level. Thus the duty cycles of the two pumps are similar, the overall effect being such that one output pulse is suppressed at intervals which are predetermined by the specific gravity value set on potentiometer $RV_2$.

For the proper functioning of the modified circuit which has been described, it is important that spurious signals should be prevented from operating the trigger stage $A_{13}$ during the reset half-cycle. This is achieved by feeding an inhibit signal, derived from transistor $J_{14}$, to the input of the trigger stage $A_{13}$. The inhibit signal is only present when there is no pulse at the input of transistor $J_{14}$ and since the inherent backlash of $A_{13}$ is much greater, it cannot cause the trigger stage $A_{13}$ to release once triggered.

The inhibit signal is essential to the proper functioning of the circuit, even in the absence of spurious signals. If, for example, the voltage of capacitor $C_4$ becomes of sufficient magnitude and of the correct polarity to trigger stage $A_{13}$, the effect of the resultant change in the output of amplifier $A_{12}$ will be retarded by the action of a smoothing circuit, comprising resistor $R_{22}$ and capacitor $C_{16}$, and the voltage on the input of trigger stage $A_{13}$ may not build up to the triggering level until after the input pulse has passed and transistor $J_3$ is reset. In the absence of an inhibit signal, the trigger stage $A_{13}$ would eventually trigger during the reset period, causing transistor $J_3$ to pump spuriously.

What is claimed is:

1. A system for converting one series of electrical pulses, having one mean pulse repetition rate, into another series of electrical pulses having another mean pulse repetition rate, the system comprising an input diode pump and an output diode pump, a reservoir capacitor connected as load to the input diode pump and as source to the output diode pump; means for connecting the input diode pump to a potential source; means for driving the input diode pump at a stroke frequency related to an input signal having the said one mean pulse repetition rate; and means for driving the output diode pump at a mean stroke frequency controlled by the voltage on the reservoir capacitor and for deriving therefrom an output signal of the output pump stroke frequency, which is the said other mean pulse repetition rate.

2. A system as claimed in claim 1, including means for controlling the stroke amplitude of the input diode pump in accordance with at least one quantity to be related with the input signal.

3. A system as claimed in claim 2 wherein the input signal comprises an electrical carrier amplitude modulated at a frequency whose mean value corresponds to the said one mean pulse repetition rate and wherein the said means for driving the input diode pump includes a demodulating and filtering network and a bistable trigger device.

4. A system as defined in claim 3 adapted to measure fluid flow comprising: means responsive to the flow rate of said fluid for producing said input signal at a frequency which is proportional to said flow rate, and means responsive to a fluid characteristic for controlling the stroke amplitude of said input diode pump in accordance with said characteristic, whereby said output signal is a measure of said flow rate corrected for changes in said fluid characteristic.

5. A device as claimed in claim 4 wherein said fluid is a liquid.

6. A device as claimed in claim 5 wherein the means for controlling the stroke amplitude of the input diode pump includes means for continuously sensing the temperature of the liquid and for automatically adjusting one end of the stroke in accordance therewith and means for setting the other end of the stroke at a predetermined value.

7. A device as claimed in claim 6 wherein said input signal is proportional to volume flow rate and wherein the means for setting the said other end of the input diode pump stroke is adapted for setting according to the specific gravity of the liquid at a reference temperature at which the said one end of the stroke is automatically set such that the device measures the flow rate in terms of mass.

8. A device as claimed in claim 7 in which the means for sensing the temperature of the liquid includes a temperature sensitive resistor housed in a probe capable of being placed in thermal contact with the liquid.

9. A device as claimed in claim 7 comprising a current meter connected to respond to current flowing into the reservoir capacitor and adapted to indicate the mass flow rate.

10. A device as claimed in claim 7 including a counting device connected to receive the output signal and to record the total mass of fluid which has passed, in terms of the total number of output pulses.

11. A system for converting one series of electrical pulses, having one mean pulse repetition rate, into another series of electrical pulses having another mean pulse repetition rate, the system comprising an input diode pump and an output diode pump, a reservoir capacitor connected as load to the input diode pump and as source to the output diode pump, means for connecting the input diode pump to a potential source, means for driving the input diode pump at a stroke frequency related to an input signal having the said one mean pulse repetition rate, means for driving the output diode pump simultaneously with the input diode pump except when the action of said output diode pump is deliberately inhibited, and means for inhibiting the action of said output diode pump when, in the presence of an input signal, the voltage of the reservoir capacitor falls below a predetermined level, the output signal of said output diode pump comprising said series of electrical pulses having another mean repetition rate.

12. A system as defined in claim 11 and also including means for rendering said inhibiting means inoperative during intervals between successive input signals.

13. A system as defined in claim 12, and also including means for controlling the stroke amplitude of the input diode pump in accordance with at least one quantity to be related with the input signal.

14. A system as defined in claim 13 wherein the input signal comprises an electrical carrier amplitude modulated at a frequency whose mean value corresponds to the said one mean pulse repetition rate and wherein the said means for driving the input pump includes a demodulating and filtering network and a bistable trigger device.

15. A system as defined in claim 14 adapted to measure fluid flow comprising: means responsive to the flow rate of said fluid for producing said input signal at a frequency which is proportional to said flow rate, and means responsive to a fluid characteristic for controlling the stroke amplitude of said input diode pump in accordance with said characteristic, whereby said output signal is a measure of said flow rate corrected for changes in said fluid characteristic.

16. A system as defined in claim 15 wherein the means for controlling the stroke amplitude of the input diode pump includes means for continuously sensing the temperature of the liquid and for automatically adjusting one end of the stroke in accordance therewith and means for setting the other end of the stroke at a predetermined value.

17. A system as defined in claim 16 wherein said input signal is proportional to volume flow rate and wherein the means for setting the said other end of the input diode pump stroke is adapted for setting according to the specific gravity of the liquid at a reference temperature at which the said one end of the stroke is automatically set such that the device measures the flow rate in terms of mass.

18. A system as defined in claim 17 in which the means for sensing the temperature of the liquid includes a temperature sensitive resistor housed in a probe capable of being placed in thermal contact with the liquid.

19. A system as defined in claim 18 and also including a current meter connected to respond to current flowing into the reservoir capacitor and adapted to indicate the mass flow rate.

20. A system as defined in claim 19 and also including a counting device connected to receive the output signal and to record the total mass of fluid which has passed, in terms of the total number of ouput pulses.

References Cited by the Examiner

UNITED STATES PATENTS

| | | | |
|---|---|---|---|
| 3,021,438 | 2/1962 | Moore et al. | 309—88.5 |
| 3,158,757 | 11/1964 | Rywak | 328—67 X |
| 3,191,058 | 6/1965 | Stone | 307—88.5 |

FOREIGN PATENTS

| | | |
|---|---|---|
| 226,161 | 12/1959 | Australia. |
| 832,411 | 4/1960 | Great Britain. |

OTHER REFERENCES

"Portable Water Velocity Meter," by Edington et al., Journal of Scientific Instruments, volume 37, December 1960, pages 455 to 457.

RICHARD C. QUEISSER, *Primary Examiner.*

E. D. GILHOOLY, *Assistant Examiners.*